United States Patent [19]
Rich, Jr.

[11] Patent Number: 5,727,669
[45] Date of Patent: Mar. 17, 1998

[54] METHOD AND APPARATUS FOR TRANSFERRING PALLETIZED LOADS

[76] Inventor: Robert M. Rich, Jr., 457 Whippers In Court, Bloomfield Hills, Mich. 48304

[21] Appl. No.: 573,252

[22] Filed: Dec. 15, 1995

[51] Int. Cl.$^6$ ........................................ B65G 37/00
[52] U.S. Cl. ............................ 198/468.6; 198/774.4; 414/267; 414/286; 414/750
[58] Field of Search ............... 198/465.1, 468.6, 198/774.1, 774.4, 782, 777; 193/35 SS; 414/267, 276, 286, 750

[56] References Cited

U.S. PATENT DOCUMENTS

| | | | |
|---|---|---|---|
| 4,044,876 | 8/1977 | Hammond | 193/35 |
| 4,185,735 | 1/1980 | Hammond | |
| 4,193,492 | 3/1980 | Hammond | 198/781 |
| 4,205,740 | 6/1980 | Hammond | 193/35 |
| 4,304,521 | 12/1981 | Hammond | 414/786 |
| 4,759,676 | 7/1988 | Hammond | 414/276 |
| 5,228,819 | 7/1993 | Hammmond | 414/267 |
| 5,605,427 | 2/1997 | Hammond | 193/35 SS |

*Primary Examiner*—Joseph E. Valenza
*Attorney, Agent, or Firm*—Harness, Dickey & Pierce, P.L.C.

[57] ABSTRACT

The present invention is directed to a conveyor system adapted to transfer palletized loads along a generally horizontal path under the force of gravity. In one preferred form, the conveyor system of the present invention includes a support structure which generally extends horizontally from an input end to an output end and includes an upwardly facing support surface for supportively engaging a load, such as a palletized load. A longitudinally extending ramp member includes an upwardly facing portion and is pivotally attached to the support structure for movement between a first position and a second position. When in the first position, the upwardly facing portion declines as it projects forwardly toward the output end. When in the second position, the ramp portion declines as it projects rearwardly toward the input end. The ramp member preferably includes two sides which are each angled from the horizontal. The sides are preferably disposed at an angle of approximately 45 degrees with respect to a horizontal plane. The conveyor system further includes a skate assembly moveable supported on the ramp portion for movement between an advance position and a return position. A drive arrangement cyclicly pivots the ramp member between the first and second positions.

16 Claims, 6 Drawing Sheets

METHOD AND APPARATUS FOR TRANSFERRING PALLETIZED LOADS

BACKGROUND OF THE INVENTION

1. Field of the Invention

In general, the present invention relates to a method and apparatus for transferring palletized loads. More particularly, the present invention relates to a conveyor system for transferring palletized loads along a generally horizontal direction under the force of gravity and a related method for transferring palletized loads.

2. Discussion

A number of different types of conveyor systems are currently known for transferring loads from a first location to a second location. For example, one common type of known conveyor system utilizes a continuous belt driven by a motor. An upper portion of the belt serves to transport loads along a generally horizontal path. Many other similar types of conveyor system are known which include load supporting or load carrying surfaces transferable by a drive unit.

It is also known to utilize gravitational forces for transferring loads in a generally horizontal direction. For example, one such conveyor system incorporates a plurality of horizontally disposed rollers, each of which are mounted for rotation about axes generally transverse to the desired direction of load travel. Rollers adjacent the input end of the system are positioned to create a slight negative slope between an input end of the conveyor system and an output end of the conveyor system. A load placed on the rollers is permitted to advance along the direction of desired travel under the force of gravity until the load reaches the output end of the conveyor system or encounters other loads adjacent the output end.

While known conveyor systems such as the types discussed above have generally proven to be commercially acceptable for a wide range of applications, all are associated with disadvantages, limitations, or both. In this regard, many of the previously known conveyor systems are not well suited for accommodating loads of significant weight. Additionally, many of the heretofore employed conveyor systems disadvantageously require an operator or separate device to selectively advance the loads. Furthermore, other known conveyor systems require a significant amount of elevational difference between input and output ends in order to satisfactorily advance the loads under the force of gravity, thereby increasing the necessary operating room.

Also known are pulsating gravity-type conveyor systems driven by pneumatic pressure which are operable for transferring loads along a generally horizontal path. One such conveyor system is described in U.S. Pat. No. 5,228,819 Hammond. The Hammond system employs a plurality of individual load-supporting trolleys or pads supported on sloped runway segments. A lifting device powered by a cyclicly applied source of compressed air functions to raise an upper end of the runway segments, thereby engaging the loads with the trolleys and displacing the loads from a support surface. At this point, gravity urges the trolleys down the incline of the runway segments until the load engages the support surface. When the source of compressed air is removed, the sloped runway segments are returned to their initial position and the trolleys are displaced from the loads. Without the added weight of the loads, the trolleys are permitted to be urged to an upper position on the inclined runway segments under the biasing force of a return spring.

While incorporating obvious advantages over conventional systems, the conveyor system taught by Hammond is also attendant with disadvantages and limitations. For example, Hammond employs a plurality of generally planar ramp surfaces on which the trolleys are supported. This planar configuration of the ramp surfaces renders them susceptible to the accumulation of dust particles and similar debris which may negatively effect performance or require additional system maintenance. In addition, the size of the return spring and the resulting spring force must be carefully chosen after considering factors such as the combined weight of the trolley and the weight of the loads. The return spring must be large enough to urge the trolley up the ramp when the trolley is displaced from its load, but not so large as to prevent the combined trolley and load from travelling down the ramp under the force of gravity. The return springs also require periodic maintenance. Furthermore, before the trolley units of the Hammond conveyor system are permitted to advance under the force of gravity, they must first overcome the force of the return spring which normally urges the trolley units in an opposite direction. As a result, the gravitational forces are mitigated and the trolley units advance at a rate slower than if the biasing force of the return spring was absent. Thus, as with the previously discussed conveyor systems, the system taught by Hammond is subject to improvement.

While known arrangements for transferring palletized loads, including but not limited to those discussed above, have generally proven to be commercially acceptable, all are fraught with one or more drawbacks. Accordingly, a need clearly exists to develop an improved conveyor system which overcomes the shortcomings of known constructions and yet which can be readily adapted for use in various conveyor applications.

SUMMARY OF THE INVENTION

Accordingly, a principal object of the present invention is to provide a method and apparatus for transferring palletized loads which utilize a plurality of ramp-like segments mounted for rotation between a first position in which associated load carrying units are urged forwardly under the force of gravity and a second position in which the load carrying units are urged rearwardly under the force of gravity.

It is another object of the present invention to provide a conveyor system which does not intrude upon the longitudinal center of the associated storage bays, thereby facilitating access to the storage bays with a forklift or other similar moving equipment.

It is a further object of the present invention to provide a conveyor system which is less susceptible to the accumulation of dust or similar debris which may negatively effect performance or necessitate shut-down of the conveyor system.

It is yet another object of the present invention to provide a conveyor system which is modular in nature, allowing for simple, inexpensive installation.

In one preferred form, the present invention is directed to a conveyor system for transferring a load in a predetermined direction including a support structure extending longitudinally parallel to the direction of load movement. The support structure extends generally horizontally from an input end to an output end and includes an upwardly facing support surface for supportively engaging the load. The conveyor system further includes a plurality of longitudinally extending ramp members each having an upwardly facing portion. The ramp members are mounted to the support structure for pivotal movement between a first position and a second position. When in the first position, the upwardly facing portion of each ramp member declines as it projects forwardly toward the output end. When in the second position, the upwardly facing portion declines as it projects rearwardly toward the input end of the support structure. In a preferred form, the ramp members include a pair of sides each of which are angled from the horizontal. In one application, each of the orthogonally arranged sides are disposed at an angle of 45 degrees to a horizontal plane.

The conveyor system also includes a corresponding plurality of skate assemblies which are movably supported on the ramp members for movement between an advance position and a return position. Each of the skate assemblies has an upwardly facing surface adapted for supportive engagement with an underside of the load. In normal operation of the conveyor system, approximately three skate assemblies are simultaneously in engagement with each of two laterally opposite sides of a palletized load for advancing the palletized load in a step-like manner.

A drive arrangement is provided for cyclicly pivoting the ramp member between the first and second positions. In response to the cyclical pivoting of the ramp member, the skate assemblies are cyclicly raised and lowered relative to the support structure to effect lifting of the load away from the support surface. Thus, the skate assemblies engage the load when the ramp members are pivoted to their first position and displace the load from the support surface so that the load is translated in the predetermined direction by gravity due to the skate assemblies moving forwardly and downwardly along their respective ramp member. Furthermore, the skate assemblies are moved to their return position under the force of gravity when the ramp members are pivoted to their second position.

In one application, each skate assembly includes a pair of skate wheels each having a pair of angled surfaces for cooperatively engaging the orthogonally arranged sides of the ramp members. In another application, the skate assemblies alternatively include three bearing members. Two of the bearing members engage a first of the orthogonally arranged sides and the third bearing member engages the other side.

In another presently preferred embodiment, the subject invention is similarly designed to convey loads, such as palletized loads, in a predetermined direction along a generally horizontal direction. The conveyor system includes a support structure substantially identical to that discussed immediately above. The conveyor system further includes a transfer beam longitudinally translatable between a forward position and a rearward position. The transfer beam includes a longitudinally extending ramp portion which declines as it extends forwardly toward the output end of the system.

The conveyor system includes a plurality of ramp portions and a corresponding plurality of skate assemblies similar to that discussed above. Distinctly however, the ramp portions each include a support foot in rolling engagement with the transfer beam. A drive arrangement operates for cyclicly translating the transfer beam between the forward position and the rearward position and resultantly cyclicly raises and lowers the skate assemblies relative to the support structure to effect lifting of the load away from the support surface. More specifically, when the transfer beam is translated to the forward position, the ramp members are pivoted to the first position and the skate assemblies in turn engage the load and displace the load from the support surface. When the transfer beam is translated to the rearward position, the stop members attached to the skate assemblies function to return the skate assembly to their rearward position on the ramp member and the cycle can be repeated.

In a preferred form, the method of the present invention is directed to a method of transporting a load in a predetermined direction under the force of gravity and includes the steps of:

a) providing a conveyor system including a support structure extending longitudinally parallel to the direction of load movement. The support structure extends generally horizontally from an input end to an output end of the conveyor system. The support structure includes an upwardly facing support surface for supportively engaging the load;

b) providing a longitudinally extending ramp member having an upwardly facing portion including two sides, each of said two sides being angled from the horizontal;

c) pivotally mounting the ramp member to the support structure for pivotal movement between a first position and a second position such that the upwardly facing portion declines as it projects forwardly toward the output end when in the first position and the upwardly facing portion declines as it projects rearwardly toward the input end when in the second position;

d) providing a skate assembly having an upwardly facing surface adapted for supportive engagement with an underside of the load;

e) disposing the skate assembly on the upwardly facing portion of the ramp member for translational movement thereon between an advance position and a return position;

f) placing the load on the upwardly facing support surface adjacent the input end of the conveyor system;

g) pivoting the ramp member to the first position so as to engage the undersurface of the load with the skate assembly and disengage the load from the upwardly facing support surface;

h) translating the skate assembly to the advance position under the force of gravity;

i) pivoting the ramp member to the second position so as to disengage the undersurface of the load from the skate assembly and engage the load with the upwardly facing support surface;

j) translating the skate assembly to the return position under the force of gravity; and k) repeating steps g through j until the load is adjacent the output end of the conveyor system.

BRIEF DESCRIPTION OF THE DRAWINGS

Additional objects, features and advantages of the present invention will become apparent from analysis of the following written specification, the appended claims and the accompanying drawings in which:

The following detailed description utilizes various terminology intended to indicate general direction for purposes of describing the figures to which reference is being made. For example, terms of direction (e.g. "forwardly" and "rearwardly") will refer to directions in the drawings to which reference is made. In this regard, the term "forwardly" will refer to the normal direction of movement of a load along the conveyor system, which direction is to the left in FIG. 1, for example.

DETAILED DESCRIPTION OF THE PREFERRED EMBODIMENTS

The present invention is specifically directed to three preferred embodiments of a conveyor system particularly well suited for transferring palletized loads along a generally horizontal path. More specifically, the present invention discloses three embodiments of a conveyor each of which include a plurality of substantially identical conveyor segments which cooperate to incrementally transport loads in a predetermined direction along a generally horizontal path.

In one exemplary use, the conveyor systems of the present invention may be incorporated into a rack-type framework including a plurality of bays or tiers disposed vertically one above the other. Each bay would include a conveyor system constructed in accordance with the present invention for providing a "first in—first out" storage of palletized loads between longitudinal ends of the bays. However, it is to be understood that while the present invention hereinafter disclosed is not limited to such an exemplary use, but rather such use should merely be considered to be an illustrative representation of the general type of environment into which the present invention may be incorporated. For example, the conveyor systems of the present invention may alternatively be utilized for line feed applications. Furthermore, while the present invention is shown and described in cooperative relationship to palletized loads, it will be readily appreciated by those skilled in the art that the subject invention can be used to transport boxes or other loads.

I. First Preferred Embodiment

Figure 1:
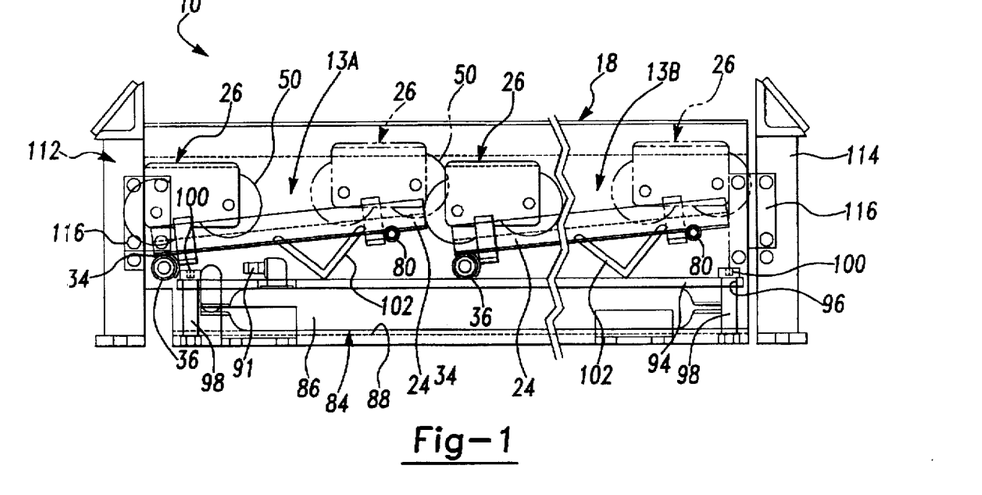
FIG. 1 is a partial side view of the ends of a conveyor system constructed in accordance with the teachings of a first preferred embodiment of the present invention, illustrated with the inflatable hose fully inflated and the ramp members resultantly moved to their first positions, or raised positions, and showing in phantom lines cooperating skate assemblies in their load engagement positions and in solid lines in their load advance positions.
Figure 2:
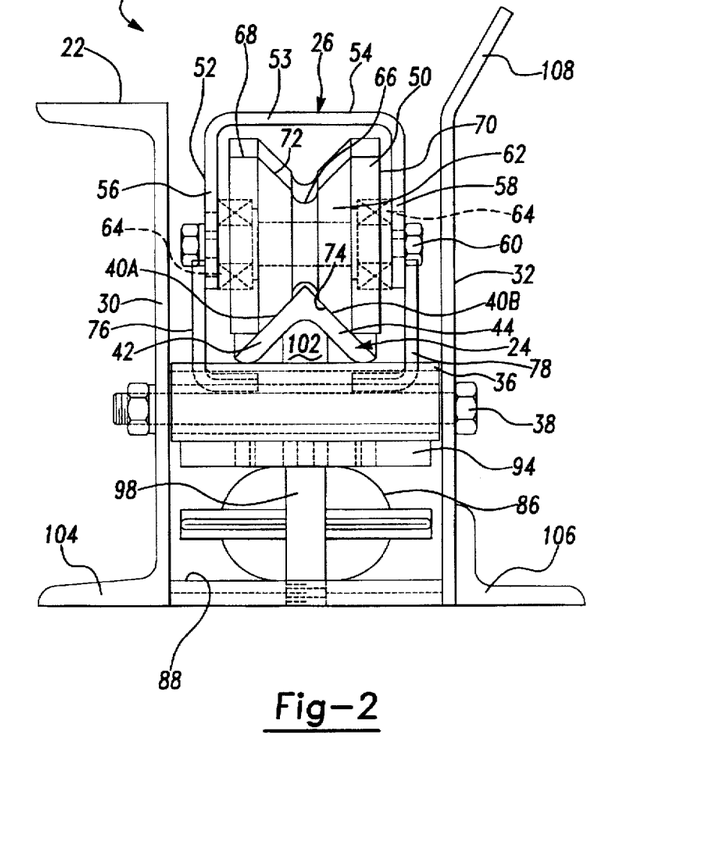
FIG. 2 is an enlarged end view of one portion of the conveyor system of FIG. 1.
Figure 3A:
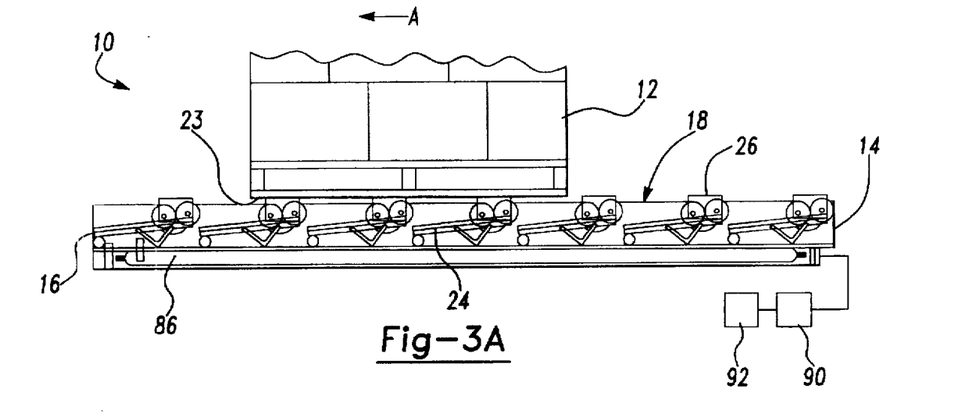
FIGS. 3A–3C represent a series of simplified side views of the conveyor system of FIG. 1 illustrated in cooperative relationship with a palletized load throughout a complete cycle of operation, and specifically illustrating the skate assemblies in their load engagement positions (FIG. 3A), the skate assemblies in their load advance positions (FIG. 3B) and the skate assemblies in their skate return positions (FIG. 3C)
Figure 3B:
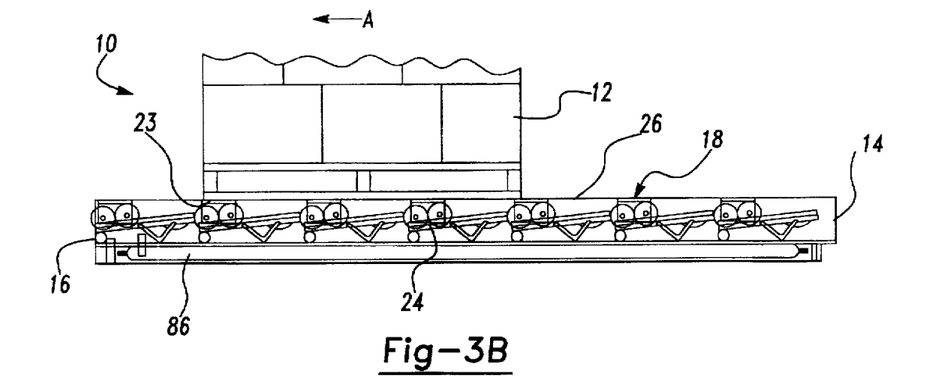
Figure 3C:
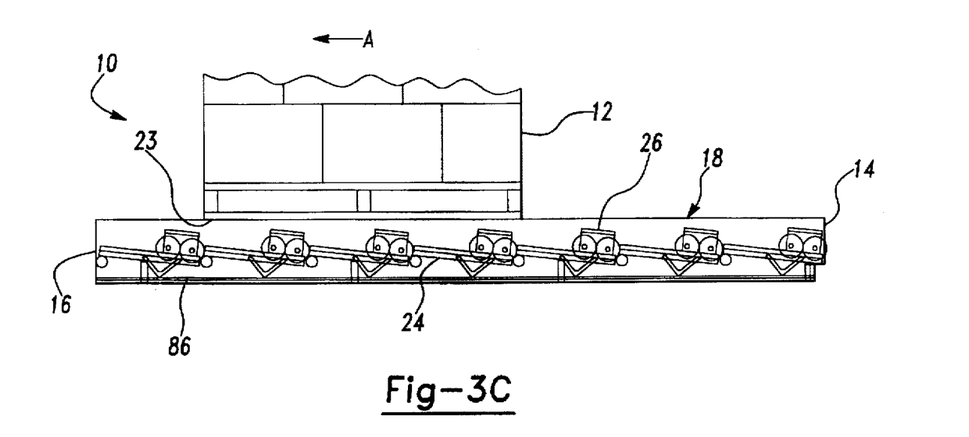
Figure 4A:
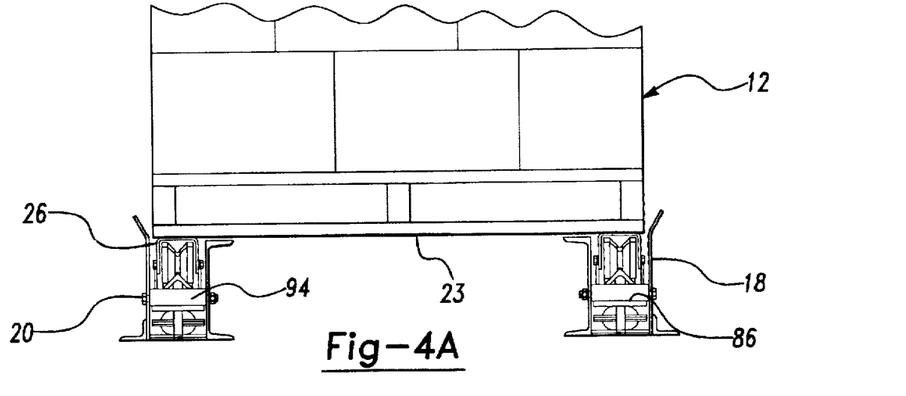
FIGS. 4A–4C represent a series of front views of the conveyor system of FIG. 1 similar to FIGS. 3A–3C.
Figure 4B:
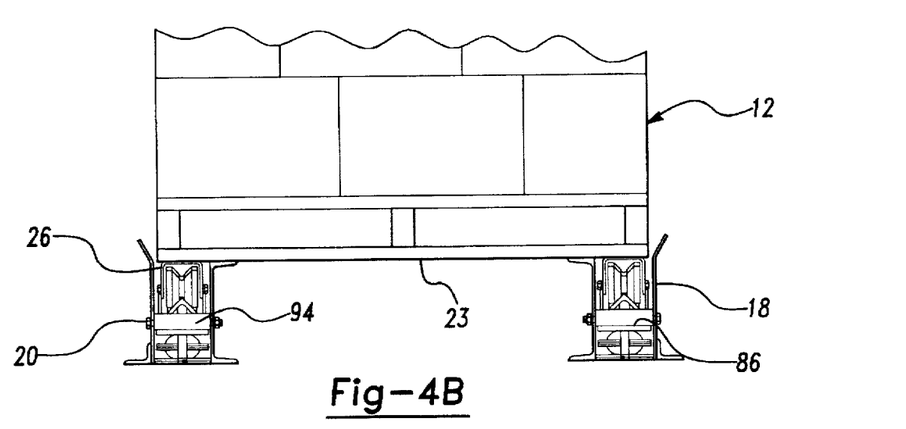
Figure 4C:
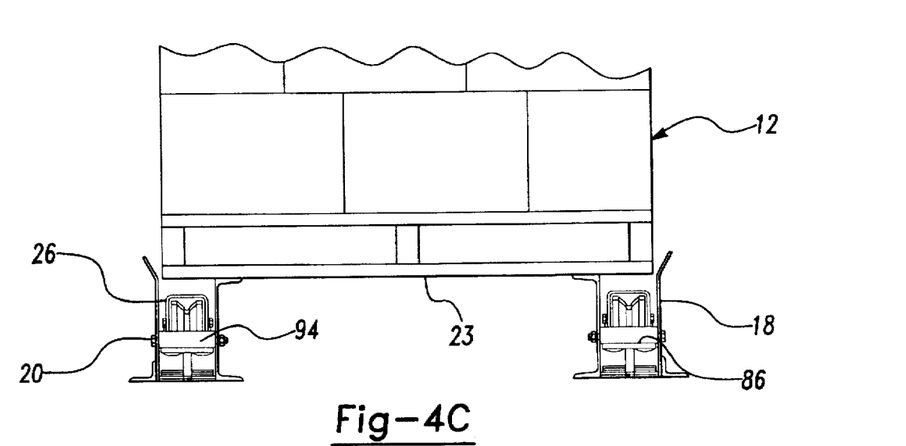

Referring now generally to FIGS. 1, 2, 3A–3C and 4A–4C, in which like elements are identified with identical reference numerals throughout, and particularly to FIG. 1, a conveyor system constructed in accordance with a first preferred embodiment of the present invention is generally identified with reference numeral 10. FIG. 1 shows a partial side view of the conveyor system 10 and FIG. 2 shows a front view of a portion of the conveyor system 10. In FIGS. 3A–3C, a series of views is provided which illustrate, from a side view, the conveyor system 10 through a cycle of operation for moving a palletized load in a step-like manner. FIGS. 4A–4C illustrate a similar series of views from a front view.

As noted above, the conveyor system 10 is specifically adapted for transferring one or more palletized loads 12 in a predetermined direction. The predetermined direction of load travel is designated in FIGS. 3A–3C with arrow A and defines a generally horizontal path between an input end 14 where the palletized loads enter the system 10 and an output end 16 where the palletized loads are removed from the system.

In FIG. 1, the conveyor system 10 is illustrated to include two substantially identical cooperating conveyor segments 13A and 13B. However, it will become apparent from the remainder of this detailed description that the teachings of the present invention are not restricted to any particular number of cooperating conveyor segments. In this regard, FIGS. 3A through 3C are shown having seven (7) such segments.

In the exemplary embodiment illustrated, the conveyor system 10 of the first preferred embodiment of the present invention includes a support structure which extends longitudinally parallel to the direction of load movement. The support structure includes first and second containment channels 18 and 20 which extend generally horizontally from the input end 14 of the conveyor system 10 to the output end 16 of the conveyor system 16. As specifically shown in FIGS. 4A–4C, a first of the containment channels 18 is located on the right side and a second of the containment channels 20 is located on the left side. The first and second containment channels 18 and 20, which cooperatively serve to support the palletized loads 12, are substantial mirror images of one another about a line extending longitudinally therebetween. Each of the first and second containment channels 18 and 20 includes an upwardly facing load support surface 22 arranged for engaging an underside 23 of the palletized loads 12. Given the symmetry of the first and second containment channels 18 and 20, a complete understanding of the first and second containment channels 18 and 20 will be had with reference to the first containment channel 18 which is shown in detail in the enlarged view of FIG. 2.

Referring now to FIGS. 1 and 2 and 3A–3C, each of the conveyor segments of the conveyor system 10 is shown to include a ramp member 24 and a skate assembly 26. The ramp member 24 is pivotally mounted to laterally spaced apart inner and outer wall portions 30 and 32 of the containment channel 18. The ramp member 24 includes an upwardly facing portion 40 for rollingly supporting the skate assembly 26. In the exemplary embodiment illustrated, a first end 34, or forward end, of the ramp member 24 is welded or otherwise suitably attached to a sleeve 36. A pivot axis is defined by a threaded fastener 38 passing through the inner and outer walls 30 and 32 of the containment channel 18 and the sleeve 36. The ramp member 24 is pivotally movable about this pivot axis between a first position (as shown in FIGS. 1, 3A and 3B) and a second position (as shown in FIG. 3C). In the first position, the upwardly facing portion 40 declines as it projects forwardly toward the output end 16 of the conveyor system 10. In the second position, the upwardly facing portion 40 declines as it projects rearwardly toward the input end 14 of the conveyor system 10.

As seen in the front view of FIG. 2, the ramp member 24 has an inverted V-shaped cross section which includes first and second orthogonally arranged sides 42 and 44. The orthogonally arranged sides 42 and 44 are each disposed at an angle of approximately 45 degrees with respect to a horizontal plane. The inverted V-shaped cross section of the ramp member 24 provides first and second angled support surfaces 40a and 40b for engagement with the skate assembly 26. As compared to prior known conveyor systems, the angled support surfaces 40a and 40b of the ramp member 24 accumulate a significantly less amount of dust, dirt and like debris. As a result, periodic maintenance for cleaning of the conveyor system 10 is reduced and the quality of performance of the conveyor system 10 is enhanced.

With continued reference to FIGS. 1 and 2, the skate assemblies 26 of the conveyor system 10 of the first embodiment of the present invention are illustrated to include a pair of skate wheels 50 rotationally attached to a skate body 52. The skate body 52 has a generally inverted U-shaped cross section that includes an intermediate portion 53 defining an upper support surface 54. The skate body 52 also includes two downwardly extending leg portions 56 and 58 which are integrally formed with the intermediate portion 53. A threaded fastener 60 passes through aligning apertures (not shown) in each of the downwardly extending leg portions 56 and 58 of the skate body 52. The threaded fastener 60 also passes through a cylindrical sleeve 62 which functions to define an axis of rotation about which the skate wheel 50 spins. The sleeve 62 is interconnected with the skate wheel 50 through a pair of suitable bearings 64 located in cylindrical recesses (not shown) at opposite horizontal sides of the skate wheel 50.

The skate wheels 50 of the skate assembly 26 are further shown to include a reduced diameter central portion 66 and first and second cylindrical ends 68 and 70. The reduced diameter central portion 66 is interconnected with the first and second ends 68 and 70 through first and second inwardly tapering portions 72 and 74, respectively. The first and second inwardly tapering portions 72 and 74 cooperatively engage the first and second angled support surfaces 40a and 40b. In the preferred embodiment, the skate wheels are constructed of steel.

Each of the skate assemblies 26 is further shown to include a stop mechanism for purposes of limiting horizontal translation along the corresponding ramp member 24. In the embodiment illustrated, the stop mechanism includes first and second downwardly extending, L-shaped legs 76 and 78. The L-shaped legs 76 and 78 further function to capture the bottom of the ramp 40 to prevent the skate assemblies 26 from being inadvertently removed from the conveyor system 10 or removed by unauthorized personnel. Further in the embodiment illustrated, the downwardly extending legs 76 and 78 are welded or otherwise suitably attached to the skate body 52. Alternatively, the legs 76 and 78 may be bolted to the skate body 52 or integrally formed with the skate body 52. The downwardly extending legs 76 and 78 function to limit horizontal translation of the skate assembly 26 through engagement with one of the ramp pivot shaft 36 and a transversely extending stop member 80 fastened to an underside of the ramp member 24.

The conveyor system 10 of the first embodiment of the present invention also includes a drive arrangement 84 for cyclicly pivoting the ramp members 24 between their first and second positions and resultantly cyclicly raising and lowering the skate assemblies 26 relative to the support structure 22 to effect lifting of the load 12 away from the support surface 22. In the exemplary embodiment illustrated, the drive arrangement 84 includes an elongated inflatable hose 86 (such as a fire hose) disposed between the inner and outer walls 30 and 32 of each of the containment channels 18 and 20. The inflatable hose 86 is normally supported on a bottom wall 88 which interconnects the inner and outer walls 30 and 32 of the containment channel 18.

As schematically illustrated in FIG. 3A, the inflatable hose 86 is connected to a suitable power source, such as an air compressor 90 through in input nozzle 91. The air compressor 90 is activated in a manner well known to those skilled in the art by a suitable control valve 92, such as a conventional time-control valve, so that the inflatable hose 86 can be cyclically inflated and deflated in an intermittent yet regulated manner. In one application, the inflatable hose 86 is cyclically inflated and deflated at a rate of six to ten cycles per minute.

The inflatable hose 86 functions to vertically displace a longitudinally elongated lifting bar member 94. The lifting bar member 94 includes apertures 96 located at each of its forward and rearward ends which receive guideposts 98 upwardly extending from the bottom wall 88 of the containment channel 18. Each of the guideposts 98 includes an enlarged upper end 100 which functions to limit and regulate upward movement of the lifting bar member 94 in response to inflation of the inflatable hose 86.

Vertical displacement of the lifting bar member 94 is transferred to pivotal movement of the ramp members 24 about their pivot axes through angled support members 102. In this regard, the angled support members 102 are supported by the lifting bar member 94 and engage the ramp member 24 at a point spaced apart from its pivot axis. When the hose 86 is inflated, the lifting bar member 94 raises the angled support member 102. The angled support member 102 in turn urges the ramp member 24 counterclockwise about its pivot axis to its first position. Similarly, when the hose 86 is deflated, the lifting bar member 94 permits the angled support 102 member to return to a lower position and gravity urges the ramp member 24 clockwise to its second position.

As shown most clearly in FIG. 2, the inner wall 30 of the containment channel 18 includes a lower base portion 104 and the upper load support surface 22. The outer wall of the containment channel 18 similarly includes a lower base portion 106 and further includes an angled upper portion 108 which functions to limit horizontal translation of the palletized loads 12 in a direction transverse to the direction of travel along the containment channels 18 and 20. While FIG. 2 illustrates the containment channel 18 to be fabricated of four (4) pieces (e.g. support surface 22, bottom wall 88, lower base portion 106, and angled upper portion 108), it will be appreciated to those skilled in the art that these elements may alternatively be combined into a single piece.

As shown in FIG. 1, the conveyor system 10 of the first preferred embodiment of the present invention includes front travel stop member 112 for limiting horizontal translation of the palletized loads 12 in the direction of travel and a rear load engaging member 114 which allows a lift truck operator to "scrape" loads 12 off onto the conveyor system 12. As illustrated, the end stop portions 112 and 114 are each interconnected with the containment channels 18 and 20 through a splice plate 116 which is bolted or otherwise suitably fastened to the end stop portion 112 or 114 and the containment channel 18.

With specific reference to FIGS. 3A-3C and 4A-4C, the operation of the conveyor system heretofore detailed will now be described. A palletized load 12 is deposited on the conveyor system 10 at an input end 14 thereof, such as by a forklift truck. As the inflatable hose 86 of the conveyor system 10 is cyclicly inflated and deflated, the ramp members 24 are resultantly pivoted between their first and second positions. When the ramp members 24 are pivoted to their first positions, the upper support surfaces 54 of the skate assemblies 26 are brought into engagement with the underside of one of the palletized loads 12 (preferably a minimum of two or three skate assemblies 26 will be engaged with each of the two laterally opposed sides of the palletized load 12) and displace the load 12 upwardly so that the load 12 is lifted a small distance above the upper support surfaces 22.

In one application, the inflatable hose 86 raises between approximately 1.5" and 1.75" and the support surface 54 of the skate assembly 26 is raised approximately ¾" above the upper support surfaces 22 of the containment channels 18 and 20. Under the force of gravity, the combined weight of the load 12 and the skate assembly 26 resultantly causes the skate assemblies 26 to roll forwardly down the incline ramp member 24. The forward advancing of the load, due to rolling movement of the skate assemblies 26 downwardly along the inclined ramp members 24, will continue either until the declining movement of the skate assemblies 26 causes the load 12 to re-engage the upper support surfaces 22 of the containment channels 18 and 20, or until the inflatable hose 86 is deflated and lowers the load 12 back into engagement with the upper support surfaces 22. In one application, the cyclical inflation and deflation of the inflatable hose 86 results in forward advancing of the load 12 through small step-like distances of approximately 8–14".

Once the inflatable hose 86 is deflated and the load 12 repositioned on the upper support surfaces 22, continued deflation of the inflatable hose 86 lowers the rearward end of the ramp members 24 to a point horizontally below the forward end. As a result, gravity urges the skate assemblies 26 to a skate assembly return position (as shown in FIG. 30). The conveyor system 10 is then in a position to repeat the cycle in that the inflatable hose 86 is again inflated so the skate assemblies 26 again lift the load 12 away from the upper support surfaces 22 and then permit a forward gravity-urged step-like advance of the load 12 in the same manner as described above.

The forward stepping of the palletized loads 12 will continue until the load 12 abuts against a stationary object, such as the front stop member 112 or a next forwardly positioned load 12. For example, if no other loads 12 are positioned forwardly on the conveyor system 10, the load 12 will be moved forwardly until it contacts the forward stop member 112 adjacent the output end 16 of the conveyor system 10. The forward stop member 112 will hold the load 12 horizontally stationary, even though the load may continue to cycle up and down in response to the pulsing of the inflatable hose 86. The load 12 is then in a position to be removed when desired, such as by use of a forklift. If several loads 12 are arranged in abutting contact rearwardly away from the output end 16 of the conveyor system 10, the loads 12 which are supplied to the input end 14 will be conveyed forwardly only until they abut the next stationary load 12. However, when the frontmost load 12 disposed directly adjacent the output end 16 is removed, then continued cyclical movement of the advancing arrangement causes all of the loads 12 to advance forwardly in a step-like manner until the leading load 12 again contacts the front stop member 112.

II. Second Preferred Embodiment

Figure 5:
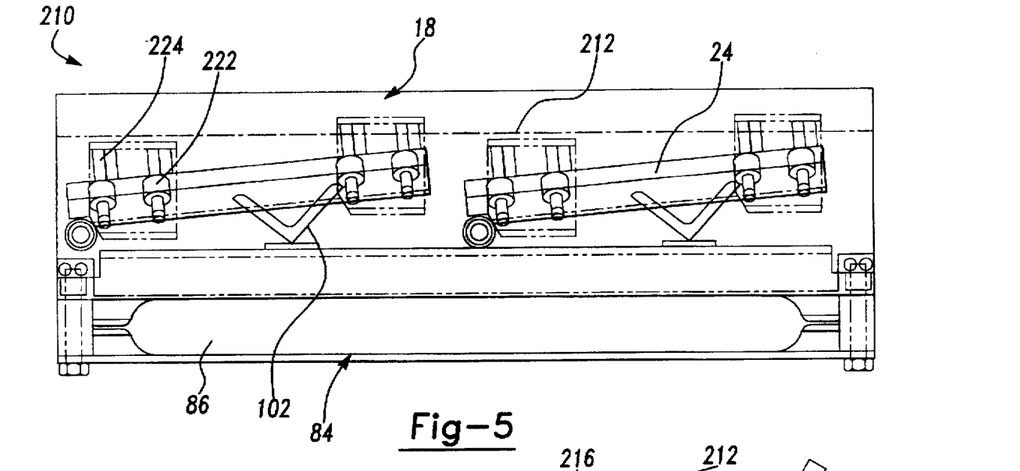
FIG. 5 is a side view of a conveyor system constructed in accordance with the teachings of a second preferred embodiment of the present invention, illustrated with the inflatable hose fully inflated and the ramp members resultantly moved to their first positions, and showing in phantom lines cooperating skate assemblies in their load engagement positions and in solid lines in their load advance positions.
Figure 6:
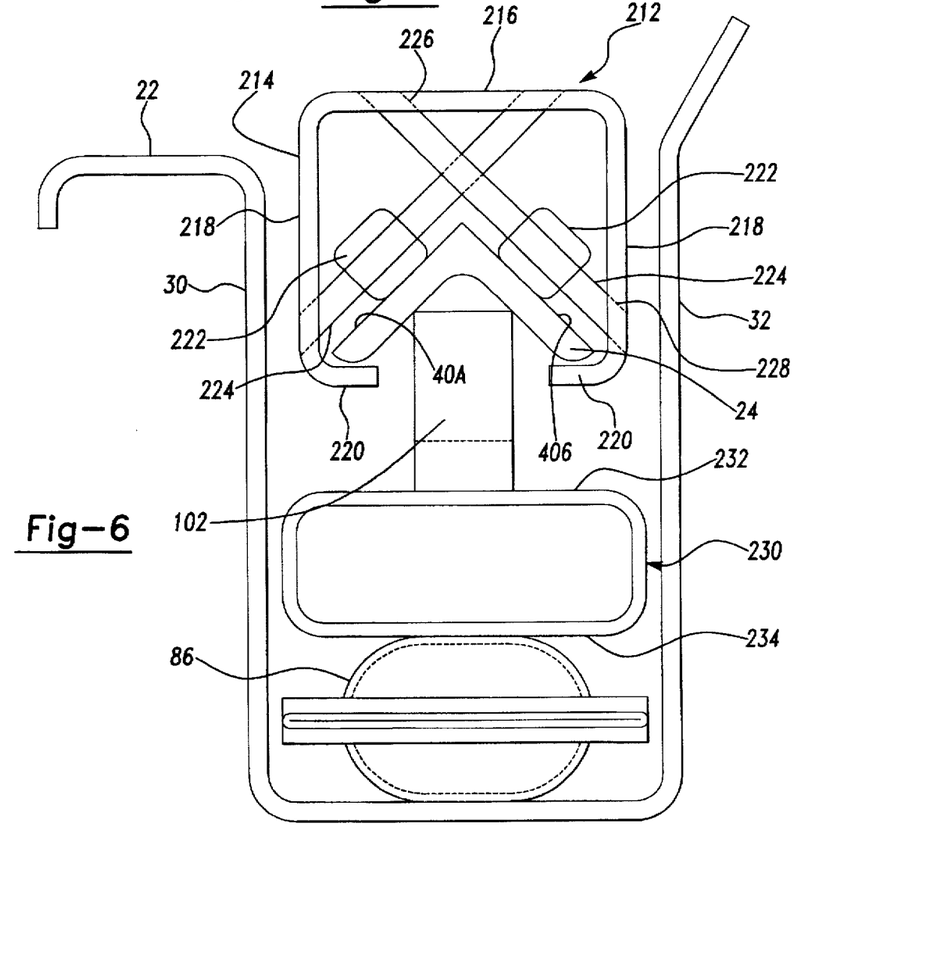
FIG. 6 is an enlarged end view of a portion of the conveyor system of FIG. 5.

With reference to FIGS. 5 and 6, a conveyor system 210 constructed in accordance with a second preferred embodiment of the present invention will now be described. To a large degree, the conveyor system 210 of the second preferred embodiment is substantially identical to the conveyor system 10 of the first preferred embodiment. This being true, the description of the second preferred embodiment will be limited to elements or features which differ in construction or function from the first embodiment. Furthermore, identical or substantially identical elements between the conveyor systems of the first and second embodiments 10 and 210 will be referenced with numerals introduced with respect to conveyor system 10 of the first embodiment.

The conveyor system 210 includes a skate assembly 212 having a unitarily constructed skate body 214 with a generally C-shaped cross section. As illustrated, the skate body 214 includes an upper support surface 216 for engaging the palletized loads 12, two downwardly extending legs 218, and inwardly extending flanges 220 interconnected to the free ends of the downwardly extending legs 218. The inwardly extending flanges 220 function in a manner similar to the downwardly extending legs 76 and 78 of the conveyor system of the first preferred embodiment 10 for purposes of limiting horizontal translation of the skate assembly 212.

Distinct from the skate assembly 26 of the first preferred embodiment, the skate assembly 212 of the second preferred embodiment incorporates a plurality of independent wheels bearing members 222 for engaging the first and second orthogonally arranged sides 42 and 44 of the ramp member 24. In the exemplary embodiment illustrated, each skate assembly 212 includes three bearing members 222. Each of the bearing members 222 is mounted for rotation about a shaft 224. Each shaft 224 engages an aperture 226 located in an upper side of the skate body 214 and an aperture 228 located in one of the downwardly extending legs 218. Further in the preferred embodiment, the bearing members 222 are offset such that two of the bearing members 222 are arranged to be supported on the first angled support surface 40a and a third of the bearing members 222 is arranged to be supported on the second angled support surface 40b.

Conveyor system 210 is illustrated to include a lifting bar member 230 configured as a generally rectangular tube. An upper surface 232 directly supports the angled support member 102 and a lower surface 234 directly engages inflatable hose 86. It will be appreciated by those skilled in the art that the conveyor system 210 of the second embodiment of the present invention may alternatively incorporate a lifting bar member constructed from flat stock.

The operation of the conveyor system 210 of the second embodiment is substantially identical to the operation of the conveyor system 10 of the first embodiment discussed above.

III. Third Preferred Embodiment

Figure 7:
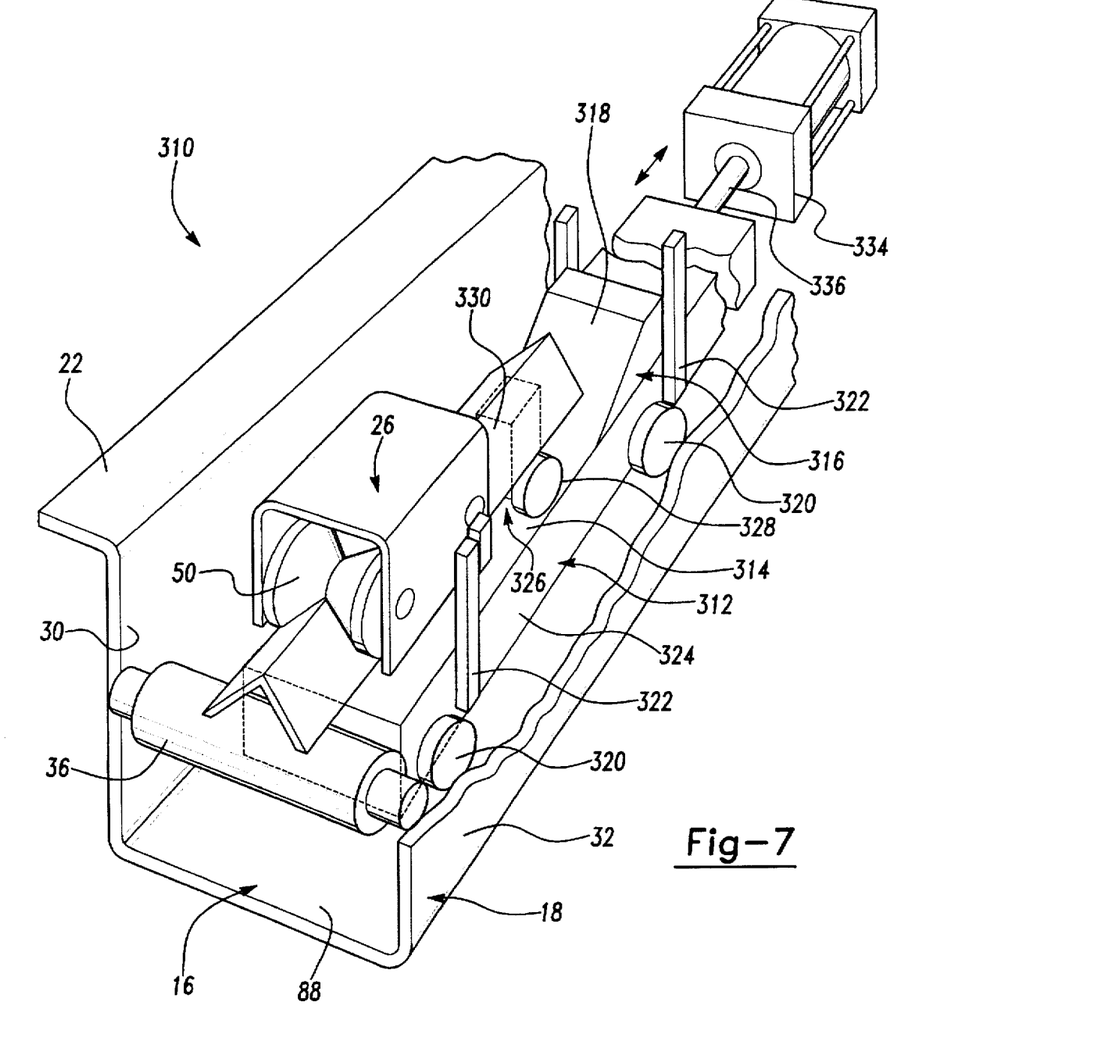
FIG. 7 is a partial elevated perspective view of a conveyor system constructed in accordance with the teachings of a third preferred embodiment of the present invention.

With reference now to FIG. 7 and FIGS. 8A–8D, a third preferred embodiment of the present invention will be described. FIG. 7 illustrates from an elevated perspective view a single conveyor segment of the conveyor system 310 of the third preferred embodiment. FIGS. 8A through 8D represent a series of simplified side views illustrating a complete cycle of the conveyor system 310.

Again, the conveyor system 310 of the third preferred embodiment includes various components that are substantially identical to the conveyor system 10 of the first preferred embodiment. For this reason, the description of the third embodiment will be addressed to elements differing in construction or operation as compared with the first embodiment. Identical or substantially identical elements between the conveyor systems of the first and third embodiments 10 and 310 will be referenced with numerals introduced with respect to conveyor system 10 of the first embodiment. As with the previously discussed embodiments, it will be appreciated by those skilled in the art that the teachings of the present invention are not limited to any particular number of conveyor segments. Also similar to the first and second embodiments, it will be understood that the conveyor system 310 a cooperating mirror image component to that shown in FIG. 7.

Distinct from the previously discussed embodiments, the conveyor system 310 of the third embodiment incorporates a transfer beam 312 disposed within the containment channel 18. The transfer beam 312 is longitudinally translatable between a rearward position (shown in FIG. 8A) and a forward position (shown in FIGS. 8B through 8D). At spaced points along an upper surface 314, the transfer beam 312 is formed to include a plurality of longitudinally extending ramp portions 316. The upper surface 314 is otherwise planar and substantially horizontal. In the embodiment illustrated, the transfer beam 316 includes a plurality of wheels 320 which are supported for rolling motion on a bottom surface of the containment channel 18.

Each of the ramp portions 316 includes an upper surface 318 that declines as it extends forwardly toward the output end 16 of the conveyor system 310. The ramp portions 316 further include a support foot 326 in engagement with the transfer beam 312. An upper end of the support foot (not shown) is attached to an underside (not shown) of a rearward end of the ramp portion 24. A lower end of the support foot 326 includes a wheel 328, or bearing, adapted to roll along the upper surface 314 of the transfer beam 312 and the upper surface 318 of the ramp portion.

The transfer beam 312 further includes a plurality of upwardly extending skate return arms 322. The skate return arms 322 are permanently attached to a side 324 of the transfer beam in any suitable manner and correspond in number to the conveyor segments. The skate return arms 322 cooperate with downwardly extending stop members 330 attached to the skate assemblies 26 to return the skate assembly 26 to a position rearward on the ramp member 24 when the transfer beam 312 is moved to its rearward position.

The conveyor system 310 of the third embodiment of the present invention also includes a drive arrangement for cyclicly moving the transfer member 312 between its forward position and its rearward position. In the preferred embodiment, the drive arrangement comprises a hydraulic cylinder 334. The hydraulic cylinder 334 includes a longitudinally displaceable plunger 336 having a stroke of approximately twelve (12) to fifteen (15) inches. A distal end (not shown) of the plunger 336 is attached to the transfer beam 312 a suitable manner.

With specific reference to FIGS. 8A through 8D, the operation of the conveyor system 310 of the third embodiment will now be described. A palletized load 12 (not shown with respect to the third embodiment) is deposited on the conveyor system 10 at an input end 14 thereof, and supported by the support surfaces 22 of the containment channels 18 and 20. While not specifically shown in FIG. 8A, the plunger 336 of the hydraulic cylinder 334 is retracted and the transfer beam 312 is in its rearward position. At this point, the ramp portion 24 is oriented substantially horizontal and the force of gravity does not effect the position of the skate assembly 26 relative to the ramp portion 24.

Figure 8A:
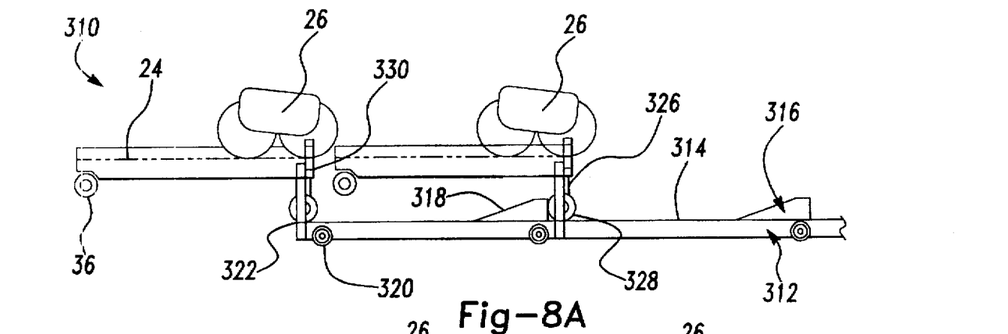
FIGS. 8A–8D represent a series of simplified side views illustrating a complete cycle of the conveyor system of FIG. 7.
Figure 8B:
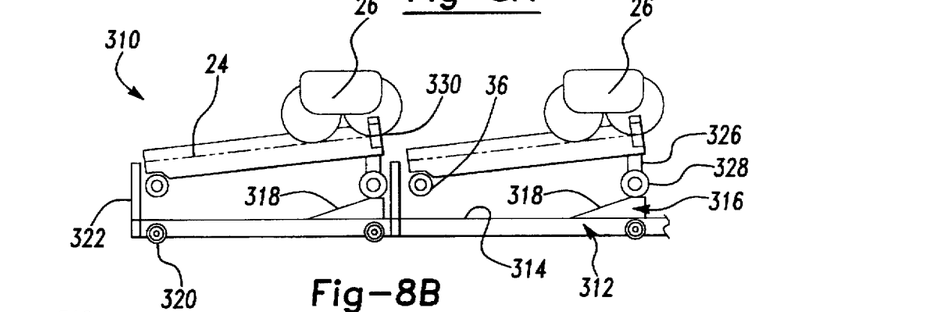

As shown in FIG. 8B, when the plunger 336 is advanced, the transfer beam 312 is shifted forwardly to its forward position. The fixed nature of the ramp member results in rearward movement of the ramp member 24 relative to the transfer beam 312 as the transfer beam 312 advances forwardly. When the wheel 328 of the support foot 326 engages the ramp portion 316 of the transfer beam, continued forward advancement of the transfer beam 312 operates to pivot the ramp portion 316 about its pivot axis. The ramp member 24 now declines as it longitudinally advances toward the output end 16 of the conveyor system 310. While not specifically shown, it will be appreciated the an upper side of the skate assemblies 26 now engage an underside 23 of the load 12 and vertically displace the load 12 from the upper support surface 22.

Figure 8C:
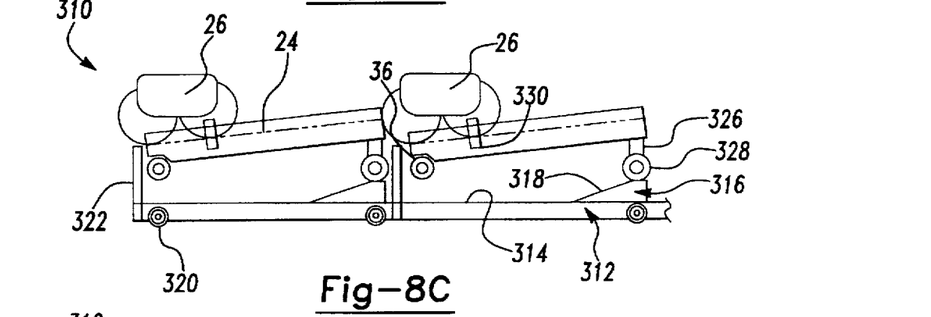

With reference to FIG. 8C, the skate assemblies 26 are now urged down the incline of the ramp member 24 under the force of gravity. As a result, the load 12 is forwardly translated until the underside 23 of the load 12 engages the upper support surface 22.

Figure 8D:
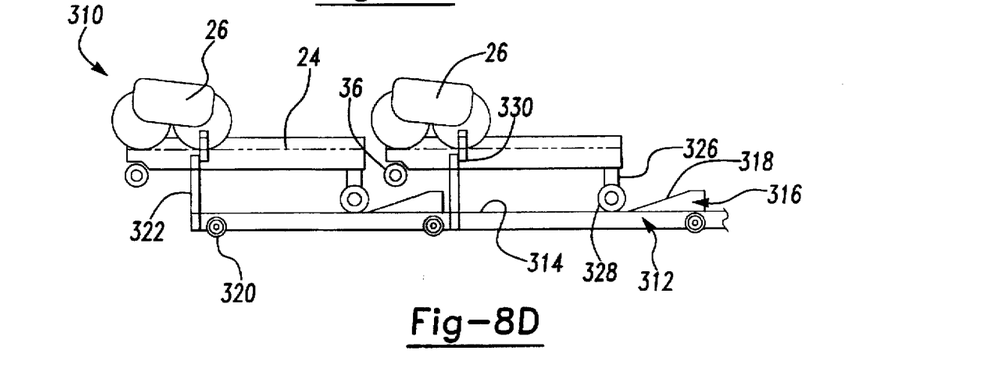

As shown in FIG. 8D, the support foot 326 of the ramp member 24 now advances down the incline of the ramp portion 316 of the transfer beam 312. At this point, the skate return arms 322 of the transfer beam 312 engage the downwardly extending stop members 330 of the skate assemblies 326, thereby limiting forward translation of the skate assembly 26 relative to the transfer beam. Now, the plunger 336 of the hydraulic actuator 334 is retracted and the transfer beam 312 rearwardly advanced. As a result, the stop members 330 attached to the skate assemblies 26 function to return the skate assembly 26 to their rearward position on the ramp member 24 as shown in FIG. 8A and the cycle can be repeated.

As with the first embodiment, the forward stepping of the palletized loads 12 will continue until the load 12 abuts against a stationary object, such as the front stop member 112 (shown in connection with the first embodiment) or a next forwardly positioned load 12.

The foregoing discussion discloses and describes a presently preferred embodiment of the present invention. One skilled in the art will readily recognize from such discussion, and from the accompanying drawings and claims, that various changes, modifications and variations can be made therein without departing from the spirit and scope of the invention as defined in the following claims.

I claim:

1. A conveyor system for transferring a load in a predetermined direction, the conveyor system comprising:

a support structure extending longitudinally parallel to the direction of load movement, said support structure extending generally horizontally from an input end to an output end, said support structure including upwardly facing support surface for supportively engaging the load;

a longitudinally extending ramp member having an upwardly facing portion, said ramp member being mounted to said support structure for pivotal movement between a first position and a second position such that said upwardly facing portion declines as it projects forwardly toward said output end when in said first position and said upwardly facing portion declines as it projects rearwardly toward said input end when in said second position, said upwardly facing portion having first and second sides angled from the horizontal;

a skate assembly movably supported between an advance position and a return position, said skate assembly having an upwardly facing surface adapted for supportive engagement with an underside of the load; and a drive arrangement for cyclicly pivoting said ramp member between said first and second positions and resultantly cyclicly raising and lowering said skate assembly relative to said support structure to effect lifting of the load away from said support surface;

whereby said skate assembly engages the load when said ramp member is pivoted to said first position and displaces the load from said support surface when said ramp member is pivoted to said first position so that the load is translated in the predetermined direction by gravity due to said skate assembly moving forwardly and downwardly along said ramp member, and further whereby said skate assembly is moved to said return position under the force of gravity when said ramp member is pivoted to said second position.

2. The conveyor system for transferring a load in a predetermined direction of claim 1, wherein each of said first and second sides is disposed at an angle of approximately 45 degrees with respect to a horizontal plane.

3. The conveyor system for transferring a load in a predetermined direction of claim 2, wherein said skate assembly is rolling supported on said ramp member.

4. The conveyor system for transferring a load in a predetermined direction of claim 3, wherein said skate assembly includes at least one skate wheel for engaging each of said first and second sides.

5. The conveyor system for transferring a load in a predetermined direction of claim 1, wherein said pivoting arrangement comprises an inflatable hose structure associated with and disposed under said ramp member for effecting cyclic pivoting of said ramp member between said first position and said second position.

6. The conveyor system for transferring a load in a predetermined direction of claim 1, wherein said support structure includes first and second laterally spaced apart containment channels.

7. The conveyor system for transferring a load in a predetermined direction of claim 2, wherein said skate assembly includes a pair of skate wheels, each said skate wheel having first and second angled surfaces for cooperatively engaging said first and second sides of said ramp member.

8. The conveyor system for transferring a load in a predetermined direction of claim 2, wherein said skate assembly includes three bearing members, a first and second of said three bearing members engaging said first side, a third bearing member of said three bearing members engaging said second side.

9. A conveyor system for transferring a load in a predetermined direction, the conveyor system comprising:

a support structure extending longitudinally parallel to the direction of load movement, said support structure extending generally horizontally from an input end to an output end, said support structure including upwardly facing support surface for supportively engaging the load;

a transfer beam longitudinally translatable between a forward position and a rearward position, said transfer beam including a longitudinally extending ramp portion which declines as it extends forwardly toward said input end;

a longitudinally extending ramp member having an upwardly facing portion, said ramp member having a first end mounted to said support structure for pivotal movement between a first position and a second position such that said upwardly facing portion declines as it projects forwardly toward said output end when in said first position and said upwardly facing portion declines as it projects rearwardly toward said input end when in said second position, said ramp member further including a support foot in rolling engagement with said transfer beam;

a skate assembly movably supported between an advance position and a return position, said skate assembly having an upwardly facing surface adapted for supportive engagement with an underside of the load; and a drive arrangement for cyclicly translating said transfer beam between said forward position and said rearward position and resultantly cyclicly raising and lowering said skate assembly relative to said support structure to effect lifting of the load away from said support surface;

wherein when said transfer beam is translated to said forward position, said ramp member is pivoted to said first position and said skate assembly in turn engages the load and displaces the load from said support surface, and further wherein when said transfer beam is translated to said rearward position, ramp member is pivoted to said second position and said skate assembly in turn is disengaged from the load and moved to said return position under the force of gravity.

10. The conveyor system for transferring a load in a predetermined direction of claim 9, wherein said upwardly facing portion of said ramp member includes first and second sides, each of said first and second sides angled from the horizontal.

11. The conveyor system for transferring a load in a predetermined direction of claim 10, wherein each of said first and second sides are disposed at an angle of approximately 45 degrees with respect to a horizontal plane.

12. The conveyor system for transferring a load in a predetermined direction of claim 11, wherein said skate assembly is rolling supported on said ramp member.

13. The conveyor system for transferring a load in a predetermined direction of claim 12, wherein said skate assembly includes at least one skate wheel for engaging each of said first and second orthogonally arranged sides.

14. The conveyor system for transferring a load in a predetermined direction of claim 9, wherein said drive arrangement includes a hydraulic cylinder having a plunger engaging said transfer beam and operative for effecting cyclic movement of said transfer beam between said forward position and said rearward position.

15. The conveyor system for transferring a load in a predetermined direction of claim 9, wherein said support structure includes first and second laterally spaced apart containment channels.

16. A method of transferring a load in a predetermined direction, the method comprising the steps of:

a) providing a conveyor system including a support structure extending longitudinally parallel to the direction of load movement, said support structure extending generally horizontally from an input end to an output end, said support structure including upwardly facing support surface for supportively engaging the load;

b) providing a longitudinally extending ramp member having an upwardly facing portion;

c) pivotally mounted said ramp member to said support structure for pivotal movement between a first position and a second position such that said upwardly facing portion declines as it projects forwardly toward said output end when in said first position and said upwardly facing portion declines as it projects rearwardly toward said input end when in said second position;

d) providing a skate assembly having an upwardly facing surface adapted for supportive engagement with an underside of the load;

e) locating the skate assembly on said upwardly facing portion of said ramp member for translational movement thereon between an advance position and a return position;

f) placing the load on said upwardly facing support surface adjacent said input end of said conveyor system;

g) pivoting said ramp member to said first position so as to engage said undersurface of said load with said skate assembly and disengage the load from said upwardly facing support surface;

h) translating said skate assembly to said advance position under the force of gravity;

i) pivoting said ramp member to said second position so as to disengage said undersurface of the load from said skate assembly and engage the load with said upwardly facing support surface;

j) translating said skate assembly to said return position under the force of gravity; and k) repeating steps g through j until the load is adjacent said output end of said conveyor system.

* * * * *